(12) United States Patent
Marissal et al.

(10) Patent No.: US 8,648,156 B2
(45) Date of Patent: Feb. 11, 2014

(54) REACTOR

(75) Inventors: Daniel Marissal, Sausset les Pins (FR); Stephen Kevin Lee, London (GB)

(73) Assignee: Ineos Commercial Services UK Limited, Hampshire (GB)

( * ) Notice: Subject to any disclaimer, the term of this patent is extended or adjusted under 35 U.S.C. 154(b) by 0 days.

(21) Appl. No.: 13/642,280

(22) PCT Filed: Apr. 12, 2011

(86) PCT No.: PCT/EP2011/055685
§ 371 (c)(1),
(2), (4) Date: Oct. 19, 2012

(87) PCT Pub. No.: WO2011/141250
PCT Pub. Date: Nov. 17, 2011

(65) Prior Publication Data
US 2013/0035459 A1 Feb. 7, 2013

(30) Foreign Application Priority Data

May 12, 2010 (EP) .................................... 10162709

(51) Int. Cl.
*C08F 2/00* (2006.01)
*C08F 4/00* (2006.01)
*C08F 210/00* (2006.01)
*B01J 19/18* (2006.01)

(52) U.S. Cl.
USPC ................ 526/64; 526/89; 526/348; 422/132

(58) Field of Classification Search
USPC ................................. 526/64, 348, 89; 422/132
See application file for complete search history.

(56) References Cited

U.S. PATENT DOCUMENTS

| 3,694,423 | A | 9/1972 | Smith et al. |
| 4,698,211 | A | 10/1987 | Storey et al. |
| 4,764,056 | A | 8/1988 | Zentgraf et al. |
| 5,693,727 | A | 12/1997 | Goode et al. |
| 5,948,871 | A | 9/1999 | Goode et al. |
| 7,014,821 | B2 | 3/2006 | Hottovy et al. |
| 2002/0107342 | A1 | 8/2002 | Mawson et al. |
| 2002/0132936 | A1* | 9/2002 | Kendrick et al. ............ 526/64 |
| 2003/0114608 | A1 | 6/2003 | Tharappel et al. |

(Continued)

FOREIGN PATENT DOCUMENTS

| EP | 0 432 555 A2 | 6/1991 |
| WO | WO 03/070365 A1 | 8/2003 |

(Continued)

*Primary Examiner* — William Cheung
(74) *Attorney, Agent, or Firm* — Nixon & Vanderhye

(57) ABSTRACT

Polymerization process in a slurry loop reactor having a slurry loop reaction zone with a volume of at least 50 m$^3$ and an internal diameter (D) of 50 cm or greater, a feed inlet for monomers and diluent, a catalyst inlet for polymerisation catalyst, and a discharge conduit for removal of polymer. Monomer, diluent and catalyst are passed into the reaction zone through their respective inlets where they form a slurry of polymer solids having a polymer solids concentration in the reaction zone of greater than 20 wt %. The space-time yield (STY) is greater than 100 kg/h/m$^3$, and the catalyst inlet is an inlet pipe such that no part of the inlet pipe protrudes beyond the wall of the reaction zone and into the reaction zone by more than 1/10$^{th}$ of the diameter of the reaction zone at the point where the inlet pipe joins the reaction zone.

29 Claims, 2 Drawing Sheets

(56) References Cited

U.S. PATENT DOCUMENTS

2007/0037935 A1 2/2007 Karer et al.
2008/0038158 A1 2/2008 Moers
2008/0081006 A1 4/2008 Myers et al.

FOREIGN PATENT DOCUMENTS

| WO | WO 2004/054700 A1 | 7/2004 |
| WO | WO 2004/092229 A1 | 10/2004 |
| WO | WO 2005/077522 A1 | 8/2005 |
| WO | WO 2008/042182 A1 | 4/2008 |

\* cited by examiner

REACTOR

This application is the U.S. national phase of International Application No. PCT/EP2011/055685 filed Apr. 12, 2011 which designated the U.S. and claims priority to European Patent Application No. 10162709.9 filed May 12, 2010, the entire contents of each of which are hereby incorporated by reference.

The present invention relates to a reactor, and in particular to a slurry loop polymerisation reactor.

BACKGROUND OF THE INVENTION

In a typical slurry polymerization reaction, monomer, diluent and a particulate catalyst are fed to a reaction zone where the monomer is polymerized. The diluent does not react but the quantity of diluent supplied to the reaction zone is typically utilized to control solids concentration in the reaction zone and also to provide a convenient mechanism for introducing the catalyst into the reactor.

Slurry loop reaction zones are in the form of continuous loop in which polymerisation occurs in the circulating slurry. Inlets are provided for the monomer and diluent and for catalyst so that they can be introduced into the reaction zone. Slurry is removed from the reactor through at least one discharge conduit and further reactants added through the inlets.

The catalyst is introduced into the reaction zone using an injection nozzle which is usually a narrow tube which projects into the reaction zone. Such is described, for example, in U.S. Pat. No. 3,694,423.

The projection into the reaction zone assists in ensuring that the catalyst is introduced into the centre of the reaction zone and into the middle of the flow of slurry. By injecting into the more central areas of the reaction zone the catalyst is generally introduced into a zone of well-defined flow from where it is quickly and evenly dispersed into the reaction mixture, and in a zone away from the walls of the reaction zone.

The catalyst is of high activity and great care has been taken to ensure that the catalyst, which is relatively concentrated at its point of injection, is quickly dispersed away from the tip of the injection nozzle to prevent fouling thereof. Numerous methods have been described which attempt to avoid the problem of fouling of the injection nozzle itself. U.S. Pat. No. 4,698,211, for example, relates to a process in a stirred tank wherein the injection nozzle is located in the same horizontal plane as an impeller to ensure rapid dispersion. In other techniques to avoid the fouling of the injection nozzle, it has been proposed to use an injection nozzle which is provided with one or more conduits around the central tube, and flowing gases or diluent into the conduits which act to "shield" the catalyst from the reaction mixture at the point of entry into the reaction zone. Reference may be made, for example, to WO 2008/042182.

Whilst this has helped to prevent fouling at the tips of the injection nozzles in slurry reactors it nevertheless remains that these nozzles represent protrusions into the reaction zone. Protrusions into the reaction zone can affect the uniform flow of slurry and can also have a propensity to fouling by formation of deposits thereon. These deposits can form and then fall off of the protrusions leading to agglomerates in the reaction zone. It is generally desired to minimise such fouling. However, to date the requirements for introducing and dispersing the catalyst have generally over-ridden any concerns about the protrusion of the injection nozzle into the reactor.

SUMMARY OF THE INVENTION

It has now been found that as the sizes of reaction zones have increased the propensity for fouling of the injection nozzles generally, by which is meant not just at the tip, increases. The present invention therefore provides an apparatus and a process which minimises the extent of protrusion of the catalyst injection pipe.

Thus, in a first aspect the present invention provides a slurry loop polymerisation reactor, which comprises:
a) a reaction zone in the form of a slurry loop,
b) at least one feed inlet for monomers, comonomers and diluent,
c) at least one catalyst inlet for polymerisation catalyst, and
d) at least one discharge conduit for removal of polymer, characterised in that the at least one catalyst inlet is in the form of an inlet pipe and no part of the inlet pipe protrudes beyond the wall of the reaction zone and into the reaction zone by more than $1/10^{th}$ of the diameter of the reaction zone at the point where the inlet pipe joins the reaction zone.

The reaction zone preferably has a volume of at least 50 m³, preferably at least 80 m³, for example 80-150 m³ and most preferably in the range 100-150 m³.

The reaction zone preferably has an internal diameter (D) of 50 cm or greater, especially 55 cm or greater. (In the art reactors are usually characterised by their outside diameter, measured in inches. Thus, a reactor may be referred to as a 24" reactor, which means a 24" outside diameter. The internal diameter depends on the thickness of the pipe, but for such a reactor would usually be about 22" (55.9 cm).) Preferably the internal diameter, D, is 60 cm or greater, for example in the range 60 to 90 cm.

The diameter of the loop reaction zone may be essentially constant along the length of the reaction zone or may vary at certain points along the reaction zone. For example, pumps may be provided in a section with a larger diameter. Unless otherwise noted or apparent, where the diameter may vary any reference to the dimensions of the reaction zone quoted herein relate to the part of the reaction zone where the catalyst inlet is located.

In the present invention the catalyst inlet is in the form of an inlet pipe and no part of the inlet pipe protrudes beyond the wall of the reaction zone and into the reaction zone by more than $1/10^{th}$ of the diameter of the reaction zone at the point where the inlet pipe joins the reaction zone. Put another way, any protrusion into the reaction zone of the catalyst inlet may be defined by the length, L, being the maximum length by which the inlet pipe protrudes into the reaction zone of diameter, D, and L/D is less than 0.1.

As used herein, L is measured as half the difference in diameter between the diameter of the reaction zone D and the diameter of the largest cylinder which is concentric with the cross-section of the reaction zone at the point where the inlet pipe enters, but which doesn't intersect any point of the inlet pipe. L is preferably less than 0.05, more preferably less than 0.025. L may be, and most preferably is zero i.e. the inlet pipe does not protrude into the reaction zone at all, but terminates at the wall of the reaction zone.

The catalyst inlet pipe preferably has an internal diameter (d) at its exit of less than 8 cm, preferably less than 5 cm, such as in the range 1 to 3 cm.

The L/d of any protrusion is preferably less than 2, and more preferably in the range 0 to 1, and most preferably is 0 (when L=0).

Although more catalyst inlets may be provided, typically one or two catalyst inlets are sufficient for introduction of catalyst into a reaction zone. For avoidance of doubt where there are multiple catalyst inlet pipes none of them should protrude by more than $1/10^{th}$ of the diameter of the reaction zone at the respective points where the inlet pipes join the reaction zone.

The reaction zone is in the form of a "slurry loop". The "slurry loop" is in the form of a continuous tube or pipe in which polymerisation occurs. Such reaction zones are conventional in the field of slurry polymerisation. The reactors may be "horizontal reactors" but preferably comprise 4 or more vertical legs, and most typically 4 to 12, such as 4 to 8 vertical legs, each being connected at their top and bottom to others of the vertical legs so as to form a continuous circulating flow path through all of the legs. The connections at the tops and bottoms of each pair of vertical pipes may be curved pipes in the forms of semi-circles, or may comprise bends with horizontal sections in between. Such reactors are well-known, for example from WO 2004/24780, U.S. Pat. No. 6,239,235 and U.S. Pat. No. 6,204,344.

Inlets are provided for monomers, comonomers and diluent and for catalyst so that they can be introduced into the reaction zone, and wherein, in use, the monomers and any comonomers which might be used react in the presence of the catalyst to form polymer particles in the form of a slurry in the diluent. Slurry is removed from the reactor through at least one discharge conduit and further reactants added.

Some of the reactants/feeds may be combined and passed through the same inlet, or separate inlets may be provided for each of monomers, comonomers and diluent. Other inlets may be provided for other reactants, such as hydrogen, as required. More than one feed inlet may be provided for each material to be fed, for example, multiple monomer inlets may be present.

At least one discharge conduit for removal of polymer is provided. Usually, multiple discharge conduits are provided. The discharge conduits may provide discontinuous discharge or continuous discharge. Discontinuous discharge usually uses what are commonly known as settling legs into which slurry flows from the reaction zone and collects, and which are periodically opened to downstream processing by opening of a valve. The rate of opening and closing of the valve can be controlled to vary discharge rate from the reaction zone. Continuous discharge usually uses a continuously open path, the discharge rate being controlled by a variable valve. Both types are known in the art.

In use, the slurry loop polymerisation reactor of the first aspect is used for polymerisation of mononomers and optionally comonomers.

Thus, in a second aspect the present invention provides a process for polymerisation in a slurry loop polymerisation reactor, which reactor comprises:
a) a reaction zone in the form of a slurry loop,
b) at least one feed inlet for monomers, diluent and optionally comonomers,
c) at least one catalyst inlet for polymerisation catalyst, and
d) at least one discharge conduit for removal of polymer,
and which process comprises passing monomer, diluent and catalyst, and optionally comonomer, into the reaction zone through their respective inlets, and wherein they react to form a slurry of polymer solids,
characterised in that the at least one catalyst inlet is in the form of an inlet pipe and no part of the inlet pipe protrudes beyond the wall of the reaction zone and into the reaction zone by more than $1/10^{th}$ of the diameter of the reaction zone at the point where the inlet pipe joins the reaction zone.

In this second aspect the preferred features of the slurry loop polymerisation reactor are as for the first aspect.

The catalyst is preferably introduced through the at least one catalyst inlet as a catalyst stream comprising catalyst in a diluent at a concentration of catalyst of less than 10 wt % relative to the weight of catalyst and diluent. Preferably the concentration of catalyst in the catalyst stream is 5 wt % or less, more preferably 2 wt % or less, and most preferably in the range 0.1 to 1 wt % (of catalyst relative to the weight of catalyst and diluent). The diluent is preferably an inert diluent and is more preferably the same as the diluent used in the polymerisation reaction. The concentration of monomer or comonomer in the catalyst stream passed into the reaction zone through the catalyst inlet(s) is preferably less than 1 wt % relative to the weight of monomer/comonomer and diluent. Most preferably monomer and comonomer are absent from this stream. This minimises/avoids contact of monomer/comonomer and catalyst in the catalyst inlet(s). Methods of preparing diluted catalyst samples and pumping them to a loop reaction zone are well-known and include, for example, WO 2004/54700 and WO 2005/77522.

In one embodiment, the maximum concentration of catalyst in the catalyst stream may be related to the concentration of polymer solids in the reaction zone. Preferably, the concentration of catalyst in the catalyst stream is less than $1/10^{th}$ of the concentration of polymer solids in the reaction zone, more preferably less than $1/20^{th}$, and most preferably less than $1/40^{th}$ of the concentration of polymer solids in the reaction zone.

The concentration of polymer solids in the reaction zone according to the present invention is preferably greater than 20 wt %, more preferably greater than 30 wt %, and most preferably greater than 40 wt %, being the weight of polymer solids relative to the total weight of the slurry (solids and liquid).

The concentration of polymer solids in the reaction zone as used herein is the value which would be obtained by measuring the density of the slurry at the point of catalyst injection, and calculating the solids concentration in weight percent using the polymer density (measured according to ASTM standard D 792 on a sample prepared according to ASTM standard D 1928 Procedure C) and an assumed liquid density of 450 kg/m$^3$.

Preferably, the catalyst stream is passed through the catalyst inlet or inlets at a linear velocity of at least 0.25 m/s, preferably at least 0.5 m/s. The velocity is measured within and at the exit end of the catalyst inlets. The velocity depends on the total volumetric flow rate of catalyst stream and the diameter of the catalyst inlet pipe at this point. For a particular desired rate of catalyst introduction, both dilution and a narrower inlet pipe diameter require a larger linear flow of the catalyst stream.

Therefore dilution and a high linear velocity both help to minimise concentration of the catalyst at the exit of the catalyst inlet pipe(s).

In a most preferred embodiment, the ratio of flow rate, measured in m/s (i.e. the linear flow rate, or flow velocity), of the catalyst slurry to the concentration of catalyst, measured in wt %, in the catalyst slurry is greater than or equal to 0.25. For example, for a catalyst concentration of 1 wt % a flow rate of at least 0.25 m/s is preferred, whereas for a catalyst concentration of 2 wt % a flow rate of at least 0.5 m/s is preferred.

In an alternative preferred embodiment, the flow rate, measured in m/s, of the catalyst slurry depends on the ratio of the concentration of catalyst in the catalyst slurry to the concentration of polymer solids of the polymer slurry in the reaction zone. In this embodiment, the flow rate, in m/s, is preferably equal or greater than 10 times the ratio of the concentration of catalyst, measured in wt %, in the catalyst slurry to the concentration of polymer solids, measured in wt %, of the polymer slurry in the reaction zone.

The process of the present invention allows reactors to be operated at relatively high space-time yields without fouling or with minimal fouling of the catalyst injection nozzle. The process is preferably operated at a space-time yield (STY) greater than 100 kg/h/m$^3$ and more preferably greater than 150 kg/h/m$^3$. The process is most preferably operated at a space-time yield (STY) in the range 200-400 kg/h/m$^3$.

Similarly, by use of the catalyst inlet of the present invention it is also possible to operate the process with a relatively high concentration of the monomer in the slurry circulating in the reactor. For example, the average monomer concentration in the reaction zone may be greater than 4 wt %, in particular in the range 4 to 10 wt %, said concentration being determined relative to the total weight of the slurry. In particular, it has been found that in terms of reducing fouling, the monomer concentration in the reaction zone is less important than the protrusion of the injection nozzle, and by so minimising or reducing the protrusion high monomer concentrations may be operated without or with reduced fouling risk. (Although it is still preferred that the catalyst inlet is not located too close to a monomer feed inlet as discussed further below.)

The catalyst inlet pipe(s) according to the first and second aspects of the present invention may protrude into the reaction zone at an essentially perpendicular orientation) (90° with respect to direction of flow of slurry within the reaction zone or at a different angle. Where it enters at an angle other than 90°, this angle is preferably less than 90° relative to the direction of flow of slurry within the loop reactor i.e. the catalyst stream enters the reaction zone angled in co-current flow with the flow of slurry in the reaction zone.

The location of the catalyst inlet pipe(s) on the reaction zone is in general not especially critical. However, certain locations can also help to minimise contact of catalyst and monomer or comonomer until the catalyst is well dispersed.

Thus, the catalyst inlet pipes may be located at a location (or locations) in the reaction zone where the olefin concentration is lower than the average concentration in the reaction zone. For example, the catalyst stream is preferably not introduced at the same location as a monomer feed inlet.

In one embodiment the catalyst inlet pipe(s) join at locations upstream of a feed inlet for olefin monomer.

Alternatively, or in addition where possible, the catalyst inlet pipe(s) may join at locations coincident with or downstream of a feed inlet for diluent.

It is also possible to locate the catalyst inlet pipe(s) at locations in the reaction zone where the slurry linear flow rate is higher than the average linear flow rate in the loop reactor, which also helps to disperse the catalyst. Example of such locations are zones of relatively narrow diameter compared to the rest of the reaction zone As a further example, the catalyst inlet pipe(s) may be located at locations in the loop reactor where the polymer solids concentration is lower than the average solids concentration in the loop reactor.

Any suitable catalyst may be introduced using the catalyst inlets. Suitable catalysts are well known and include Phillips ("chromium"), Ziegler and metallocene catalysts. Preferably the catalyst is a metallocene catalyst.

The monomers are preferably olefins, such as ethylene or propylene.

The comonomers are preferably α-olefins other than the monomer, and having up to 12 carbon atoms. Those having at least 4 carbon atoms, especially having 4 to 8 carbon atoms, such as 1-butene, 1-hexene and 1-octene, are preferred The diluent is usually an inert hydrocarbon liquid, more usually an alkane or a mixture of alkanes. Preferred diluents are acyclic, aliphatic hydrocarbons having 3 to 8 carbon atoms, such as propane, n-butane, iso-butane, n-pentane, iso-pentane, n-hexane, iso-hexane, etc and mixtures thereof. Iso-butane is particularly preferred.

Other components may be fed to the reactor. Examples include hydrogen. Some catalysts may utilise one or more co-catalysts. Such co-catalysts may be fed via the catalyst inlets or, and preferably, may be separately fed to the reactor. Examples of co-catalysts which may be used with polymerisation catalysts include aluminum alkyls such as triethylaluminum or TEAL, triisobutylaluminum or TIBAL, ethylaluminum dichloride or EADC, and diethylaluminum chloride or DEAC. Co-catalysts may be used "neat" or in diluted form.

A number of different inlet types can be used for introduction of components such as monomers, comonomers and diluent into the reaction zone. Reference may be made, for example, to U.S. Pat. No. 7,014,821, which teaches that monomer and comonomer may be fed to the loop reactor by a simple opening to the reactor, a nozzle, a sparger, or other distribution apparatus.

In the present invention preferably no inlets (i.e. including those for reactants, such as monomer or comonomers, or other components, such as diluent) protrude into the reaction zone by more than $\frac{1}{10}^{th}$ of the diameter of the reaction zone at the point where each respective inlet joins the reaction zone, and most preferably, none of said inlets protrude into the reaction zone at all. (The protrusion of each inlet into the reaction zone, $L_i$, is zero).

It is preferred that the reaction zone in the present invention is substantially free from internal obstructions. It is noted that despite the reference to the use of nozzles for monomer and comonomer the reactor of U.S. Pat. No. 7,014,821 is said to be substantially free of internal obstructions. In the present invention the reaction zone is not only preferably substantially free from internal obstructions but further has no nozzles which protrude into the reaction zone, and hence provides a yet clearer flow path for the slurry in the reaction zone.

BRIEF DESCRIPTION OF THE DRAWINGS

The present invention may be illustrated in schematic form by reference to FIGS. 1 to 3, in which.

DETAILED DESCRIPTION OF PREFERRED EMBODIMENTS

Figure 1:
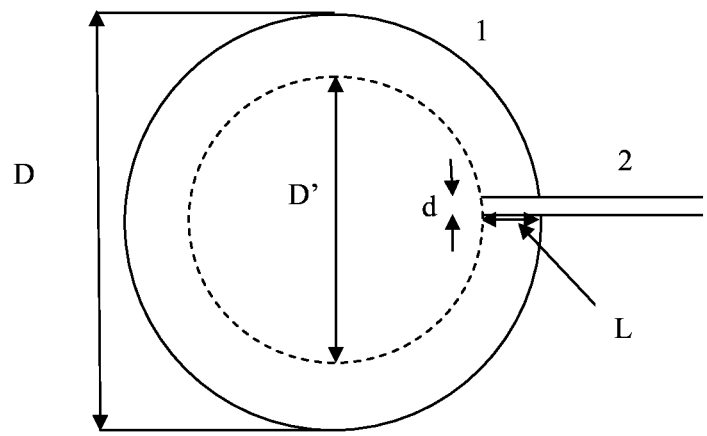
FIG. 1 shows in top view a cross-section of an embodiment of a loop reaction zone.

FIG. 1 shows in top view the cross-section of a loop reaction zone, 1, of diameter D. Also shown is a catalyst inlet, 2, which protrudes into the reaction zone in the form of an inlet pipe and protrudes beyond the wall of the reaction zone and into the reaction zone by a length L and having an internal diameter, d, at its exit. In the present invention L is less than $\frac{1}{10}^{th}$ of the diameter of the reaction zone, D, at the point where the inlet pipe joins the reaction zone. The determination of L is also shown by reference to the diameter, D', of the largest cylinder which is concentric with the cross-section of the reaction zone where the catalyst inlet enters the reaction zone, but which doesn't intersect any point of the inlet pipe, L being half the difference between D and D'.

Figure 2:
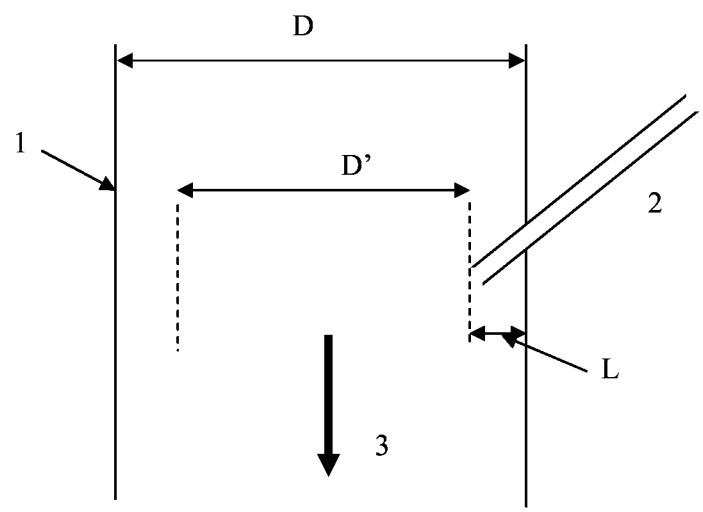
FIG. 2 shows a side view of FIG. 1.

FIG. 2 shows FIG. 1 as a side view. It can be seen that in this Figure the catalyst inlet, 2, protrudes into the reaction zone at an angle to the wall of the loop reaction zone of less than 90° relative to the direction of flow of slurry within the loop reactor (shown in FIG. 2 by the arrow 3). This further exemplifies the measurement of L.

Figure 3:
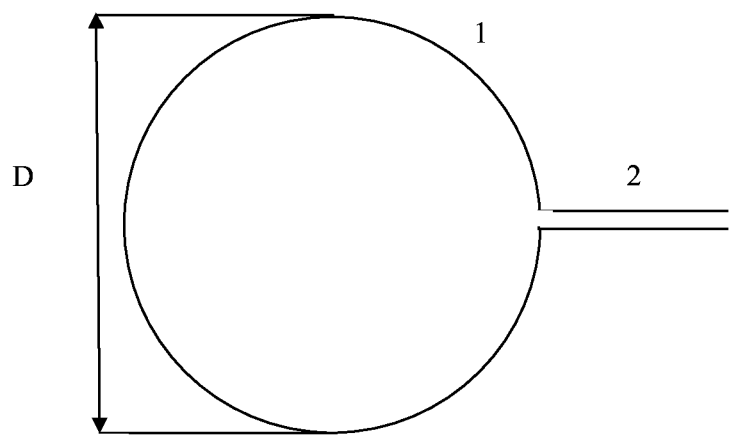
FIG. 3 shows in top view a cross-section of another embodiment of a loop reaction zone.

FIG. 3 shows in top view the cross-section of a loop reaction zone, 1, of diameter D of the preferred embodiment of the present invention where the catalyst inlet, 2, does not protrude into the reaction zone at all (D'=D, L=0).

The invention claimed is:

1. A process for polymerisation in a slurry loop polymerisation reactor, which reactor comprises:
    a) a reaction zone in the form of a slurry loop and having a volume of at least 50 m$^3$ and an internal diameter (D) of 50 cm or greater,
    b) at least one feed inlet for monomers and diluent,
    c) at least one catalyst inlet for polymerisation catalyst, and
    d) at least one discharge conduit for removal of polymer,
    and which process comprises passing monomer, diluent and catalyst into the reaction zone through their respective inlets, and wherein they react to form a slurry of polymer solids having a concentration of polymer solids in the reaction zone of greater than 20 wt %, being the weight of polymer solids relative to the total weight of the slurry (solids and liquid), wherein the process is operated at a space-time yield (STY) greater than 100 kg/h/m$^3$, and
    wherein the at least one catalyst inlet is in the form of an inlet pipe and no part of the inlet pipe protrudes beyond the wall of the reaction zone and into the reaction zone by more than 1/10$^{th}$ of the diameter of the reaction zone at the point where the inlet pipe joins the reaction zone.

2. A process as claimed in claim 1 wherein the catalyst is introduced through the at least one catalyst inlet as a catalyst stream comprising catalyst in a diluent at a concentration of catalyst of less than 10 wt % relative to the weight of catalyst and diluent.

3. A process as claimed in claim 1 wherein the concentration of catalyst in the catalyst stream is less than 1/10$^{th}$ of the concentration of polymer solids in the reaction zone.

4. A process as claimed in claim 1 wherein the catalyst stream is passed through the catalyst inlet or inlets at a linear velocity of at least 0.25 m/s.

5. A process as claimed in claim 1 wherein the ratio of flow velocity, measured in m/s, of the catalyst slurry to the concentration of catalyst, measured in wt %, in the catalyst slurry is greater than or equal to 0.25.

6. A process as claimed in claim 1 wherein the concentration of polymer solids in the reaction zone is greater than 30 wt %, being the weight of polymer solids relative to the total weight of the slurry (solids and liquid).

7. A process as claimed in claim 1 wherein the flow velocity, measured in m/s, of the catalyst slurry is equal or greater than 10 times the ratio of the concentration of catalyst, measured in wt %, in the catalyst slurry to the concentration of polymer solids, measured in wt %, of the polymer slurry in the reaction zone.

8. A process as claimed in claim 1 wherein the process is operated at a space-time yield (STY) greater than 150 kg/h/m$^3$.

9. A process as claimed in claim 1 wherein the monomer is ethylene, and the ethylene concentration in the reactor is greater than 4 wt %, based on the total weight of the slurry.

10. A process according to claim 1 wherein the catalyst inlet pipe has an internal diameter (d) at its exit of less than 8 cm.

11. A process according to claim 1 wherein the reaction zone has an internal diameter (D) of 60 cm or greater.

12. A process according to claim 1 wherein L/D is less than 0.05, L being the maximum length by which the inlet pipe protrudes into the reaction zone, and D being the diameter of the reaction zone.

13. A process according to claim 1 wherein the inlet pipe does not protrude into the reaction zone at all.

14. A process according to claim 1 wherein the L/d is less than 2, L being the maximum length by which the inlet pipe protrudes into the reaction zone and d being the internal diameter of the catalyst inlet pipe.

15. A process according to claim 1 wherein the reaction zone has a volume of at least 80 m$^3$.

16. A process as claimed in claim 3 wherein the concentration of catalyst in the catalyst stream is less than 1/20$^{th}$ of the concentration of polymer solids in the reaction zone.

17. A process as claimed in claim 3 wherein the concentration of catalyst in the catalyst stream is less than 1/40$^{th}$ of the concentration of polymer solids in the reaction zone.

18. A process as claimed in claim 4 wherein the catalyst stream is passed through the catalyst inlet or inlets at a linear velocity of at least 0.5 m/s.

19. A process as claimed in claim 6 wherein the concentration of polymer solids in the reaction zone is greater than 40 wt %, being the weight of polymer solids relative to the total weight of the slurry (solids and liquid).

20. A process as claimed in claim 8 wherein the process is operated at a space-time yield (STY) in the range 200-400 kg/h/m$^3$.

21. A process as claimed in claim 9 wherein the monomer is ethylene, and the ethylene concentration in the reactor is in the range 4 to 10 wt % based on the total weight of the slurry.

22. A process according to claim 10 wherein the catalyst inlet pipe has an internal diameter (d) at its exit of less than 5 cm.

23. A process according to claim 10 wherein the catalyst inlet pipe has an internal diameter (d) at its exit in the range 1 to 3 cm.

24. A process according to claim 11 wherein the reaction zone has an internal diameter (D) in the range 60 to 90 cm.

25. A process according to claim 12 wherein L/D is less than 0.025.

26. A process according to claim 14 wherein the L/d is in the range 0 to 1.

27. A process according to claim 14 wherein the L/d is 0 (when L=0).

28. A process according to claim 15 wherein the reaction zone has a volume in the range 100-150 m$^3$.

29. A process according to claim 1 wherein monomers, diluent, catalyst and comonomers are passed into the reaction zone.

* * * * *